Figure 1:
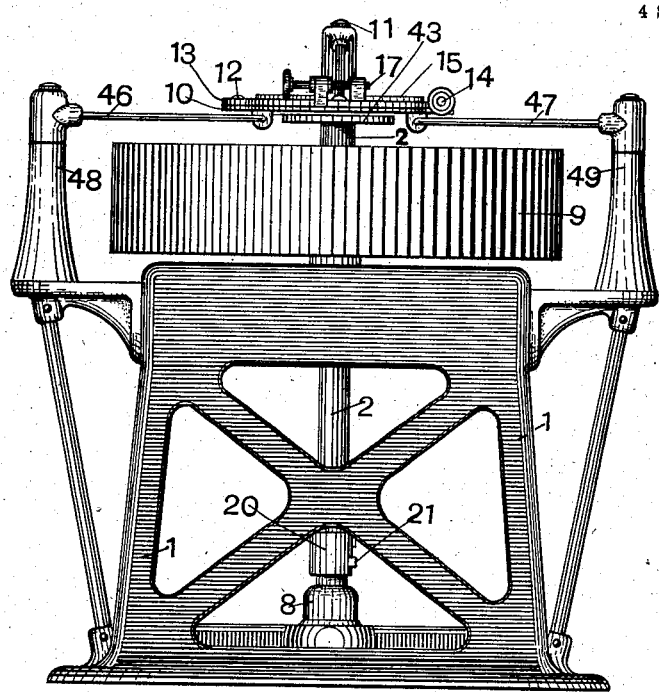

No. 728,315. PATENTED MAY 19, 1903.
O. SNELL.
INSTRUMENT FOR LOCATING OVERBALANCE IN REVOLVING BODIES.
APPLICATION FILED AUG. 21, 1901.
NO MODEL. 4 SHEETS—SHEET 1.

WITNESSES:
Alexander E. Keith
Chas. J. Erickson

INVENTOR:
Oscar Snell

No. 728,315. PATENTED MAY 19, 1903.
O. SNELL.
INSTRUMENT FOR LOCATING OVERBALANCE IN REVOLVING BODIES.
APPLICATION FILED AUG. 21, 1901.
NO MODEL. 4 SHEETS—SHEET 2.
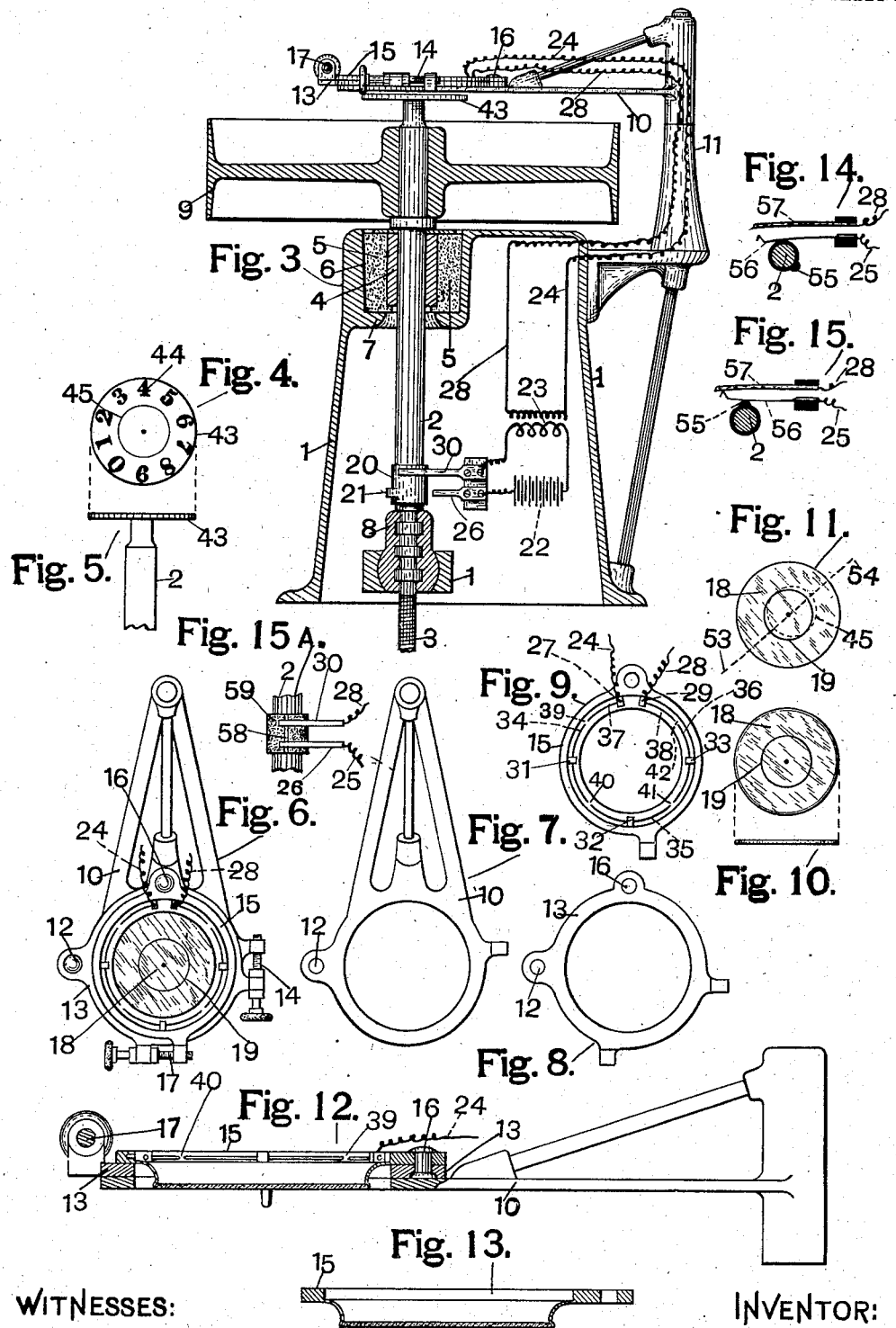
WITNESSES:
Alexander E. Keith
Chas. J. Erickson
INVENTOR:
Oscar Snell.

No. 728,315. PATENTED MAY 19, 1903.
O. SNELL.
INSTRUMENT FOR LOCATING OVERBALANCE IN REVOLVING BODIES.
APPLICATION FILED AUG. 21, 1901.
NO MODEL. 4 SHEETS—SHEET 3.

WITNESSES:
Alexander E. Keith
Chas. J. Erickson

INVENTOR:
Oscar Snell

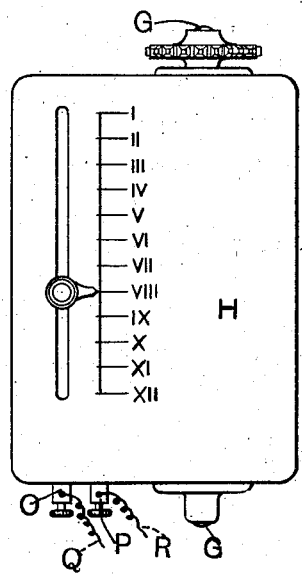
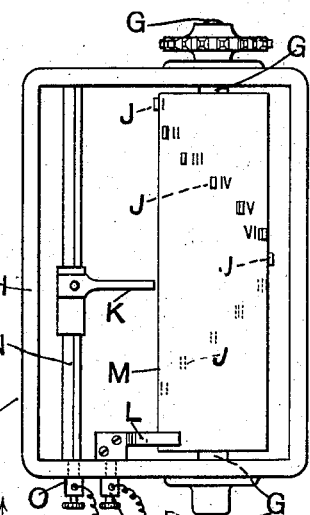
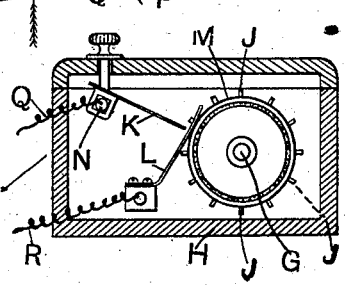
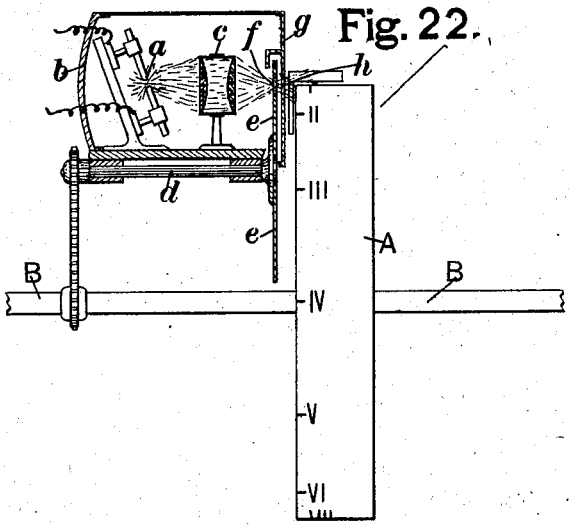
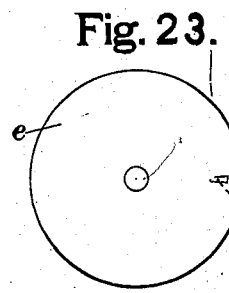

No. 728,315. Patented May 19, 1903.

UNITED STATES PATENT OFFICE.

OSCAR SNELL, OF CHICAGO, ILLINOIS, ASSIGNOR OF ONE-HALF TO ALEXANDER E. KEITH, OF CHICAGO, ILLINOIS.

INSTRUMENT FOR LOCATING OVERBALANCE IN REVOLVING BODIES.

SPECIFICATION forming part of Letters Patent No. 728,315, dated May 19, 1903.

Application filed August 21, 1901. Serial No. 72,747. (No model.)

*To all whom it may concern:*

Be it known that I, OSCAR SNELL, a citizen of the United States, residing at Chicago, in the county of Cook and State of Illinois, have invented a new and useful Instrument for Locating Overbalance in Revolving Bodies, of which the following is a specification.

My invention relates to instruments for indicating the location of overbalance in the material of revolving bodies where the center of gravity and the geometric center do not coincide; and my object is to provide a construction by which not only the circumferential location, but also the amount of overbalance, may be quickly and accurately indicated, so that a practically perfect balance may be attained, even in bodies having a very high rotative speed or in those having a more than usual length on the rotative center, such as drums for sanding-machines and the rotative parts of a certain class of steam-turbines.

This invention primarily consists of means for revolubly mounting a body to be tested which is adapted to yield substantially radially outwardly, whereby the overbalanced side of the body when in revolution may move radially outwardly from its geometric center, in combination with means for producing flashes of light of very short duration so regularly relatively to the revolution of the body that for well-known reasons indicating means—such as circular solid or broken lines, circularly-arranged points, a concentric point or circular edges, or other similar means or any means for a similar purpose directly connected to or indirectly connected with the revolving body, so as to be substantially concentric with the geometric or desired rotative center of such body, together with all accompanying signs, characters, or any other means for particularly designating different or certain circumferential points or locations—are made visible not only for direct visual inspection, but may be photographed in whatever position out of the true geometric or desired center the overbalance has caused the revolving body and the means for designating particular circumferential points or locations to assume relative to some stationary or moving point, line, or object provided for indicating the true geometric or desired position or from which the same may be measured or estimated. Various constructions may be employed to embody this invention, and although each may differ from the other relatively in the direction of the plane of revolution the body under test may assume and in the manner of providing an intermittent flash-light at certain times and the particular means for indicating overbalance and its location they all serve in the same general manner to attain a substantially similar or the same result. Therefore in order that the scope of the invention may be fully understood I have hereinafter described more than one construction for the above-named purposes, the same being illustrated in the accompanying drawings, in which—

Figure 2:
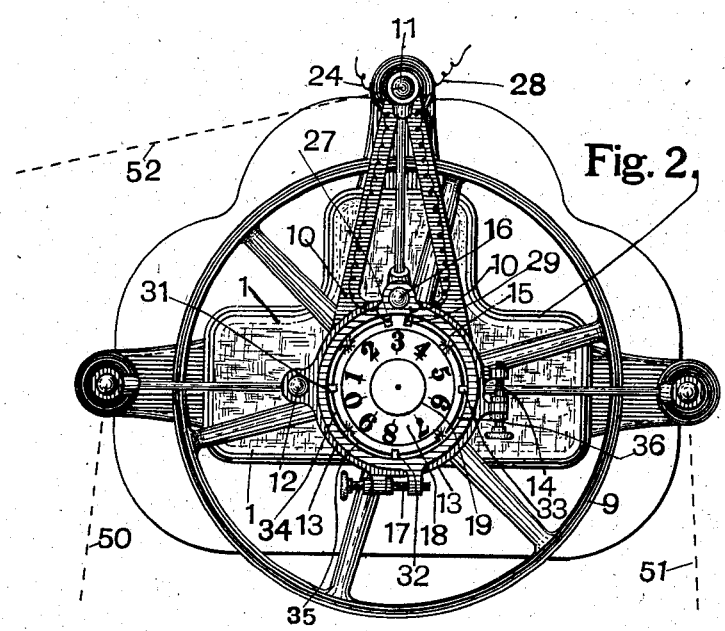
Figure 16:
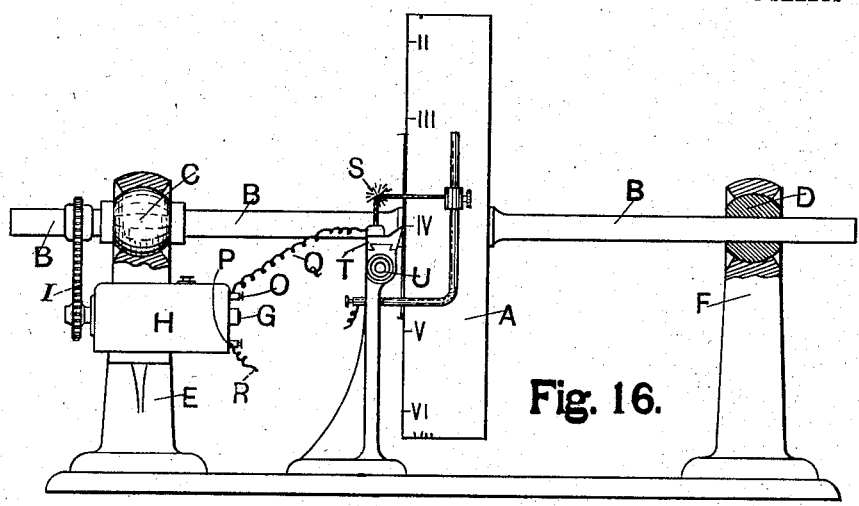
Figure 17:
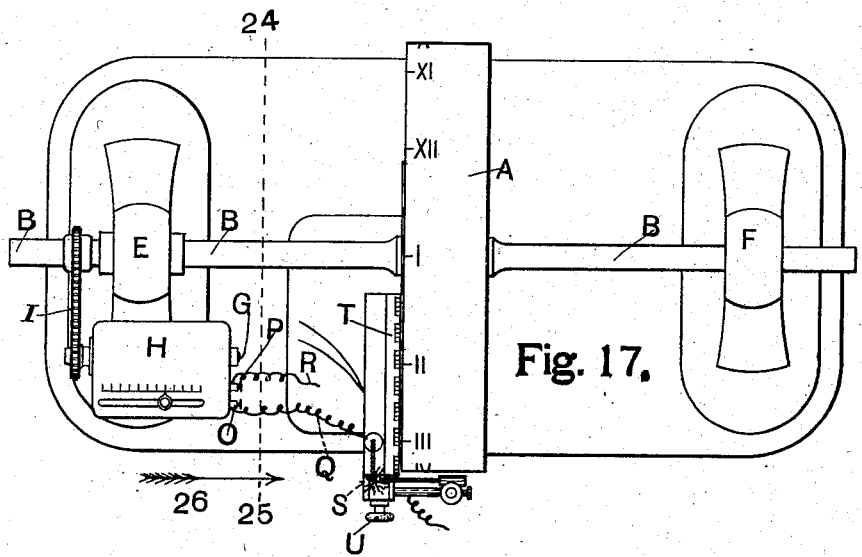
Figure 18:
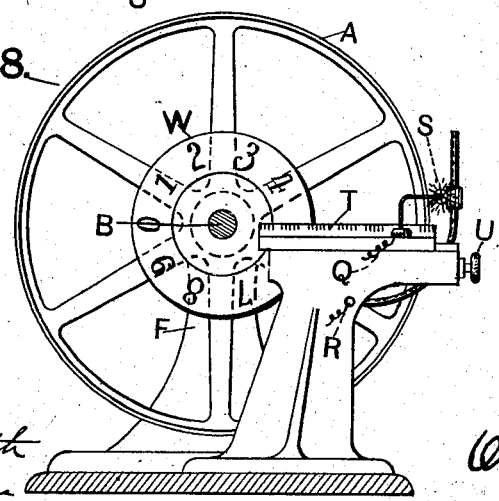

Figure 1 is a front elevation, and Fig. 2 a plan, of one system of mechanism in which is embodied my invention, the revoluble body to be tested for overbalance being mounted on a vertical operating-shaft to be revolved in a horizontal plane. Fig. 3 is a vertical section of the main base-frame axially through the yieldingly-mounted journal-boxes of the vertical operating-shaft and of a rotative body in the form of a pulley mounted on the latter. The shaft, together with a number of other parts, including an electric-current make-and-break device with a contact-arm insulatingly mounted directly on the operating-shaft for controlling an electric current to produce an intermittent flash-light, is shown in side elevation, the other parts of the electric apparatus being shown diagrammatically, since any adequate source of electric current may be utilized. Fig. 4 is a plan of the rotative disk, which is a means for indicating the location and amount of overbalance in a revolving body, and this disk in this instance is mounted on the top portion of the operating-shaft, the latter being illustrated in side elevation, together with the indicating-disk in Fig. 5. Fig. 6 is a plan of an arm, which is pivotally connected with the base-frame of the instrument in this instance, but it is obvious that it may be supported independently of the instrument, so as not to partake of its vibrations, and this arm serves to carry at the outer end portion adjustable means for indicating, in combination with the disk Fig 4, the position of the geometric center of the revoluble body when the latter is either in motion or at rest. Fig. 7 is the same as Fig. 6, but with adjustable parts of the indicator removed. Fig. 8 is a plan of a ring, which is pivotally mounted at one side of and is fitted to swing in a horizontal plane on the outer ring portion of the arm Fig. 7. Fig. 9 is a plan of another ring, which is pivotally mounted upon the ring shown in Fig. 8, so as to swing thereon at a substantially right angle to the movement of ring Fig. 8 on arm Fig. 7, the first-named ring being held in accurate adjustment on arm Fig. 7, and similarly the second-named ring is held in adjustment on the first by means of screws disposed at opposite sides of their pivotal centers. Fig. 10 is a plan of a plate of transparent material—such as glass, celluloid, &c.—which is secured in the large central opening in the ring shown in Fig. 9. Fig. 11 is the same as Fig. 10, but showing a solid circular line in combination with a broken circular line to illustrate the location of overbalance in the connected revolving body under test. Fig. 12 is a side elevation, scale two to one, of what is shown in Fig. 6, but with the rings Figs. 8 and 9 and a part of the ring end of the arm Fig. 7 broken away to an axial section, so as to clearly illustrate the relative position of these parts. Fig. 13 is a separate axial section, same scale as is shown in Fig. 12, of the top ring Fig. 9 to clearly illustrate the form thereof in cross-section and relative position of the transparent disk illustrated in Fig. 10. Figs. 14 and 15 diagrammatically illustrate, respectively, in the open and closed position an electric-current make-and-break mechanism, and still another make-and-break device is shown in Fig. 15^A, and any one of which may be substituted for the mechanism for the same purpose illustrated in Fig. 3 when testing bodies revolving at an unusually high rate of speed. Figs. 16 and 17 show, respectively, a front elevation and a plan of the instrument arranged for a horizontal operating-shaft, so that the pulley or other rotative body revolves in a vertical instead of a horizontal plane, and instead of there being a special disk for indicating circumferential location the characters for designating such locations are placed directly upon the pulley, and instead of the revolving contact operating the electric-current make-and-break device being located directly on the operating-shaft this whole mechanism is in a separate box and is geared to revolve in unison with the rotative body by means of chain-and-sprocket-wheel gearing; also, instead of but one revolving-contact projection for the make-and-break device there are twelve, or one for each location-indicating character— in this instance on the rotative body—as is fully described hereinafter. Fig. 18 is a vertical cross-section of the base-plate and operating-shaft on broken line 24 25, Fig. 17, several parts of the instrument being shown in end elevation as if looking in the direction indicated by the arrow 26. Fig. 19 is a plan, on an enlarged scale, of the box seen in Figs. 16 and 17, which contains the separate electric-current make-and-break device. Fig. 20 is a plan of what is shown in Fig. 19, but with the top removed to show the interior mechanism. Fig. 21 is an end elevation of the box, Figs. 19 and 20, with one end removed, looking in the direction indicated by arrow 22. Fig. 22 is a diagrammatic view of a means for obtaining an intermittent light at regular intervals and which would be suitable for this instrument when used for testing low-speed rotative bodies. Fig. 23 is a front elevation of a revoluble disk or shutter for the apparatus illustrated in Fig. 22.

Similar numerals indicate like parts in Figs. 1 to 15, inclusive, and similar letters indicate like parts in the remaining figures of the drawings.

The frame 1, Figs. 1, 2, and 3, is adapted to support a vertically-disposed operative shaft 2, which may be revolved in any convenient manner, so as not to produce objectionable vibrations—as, for an instance, the shaft 2 may be revolved directly by an electric, rotary steam, or hydraulic motor, or power may be transmitted to it through the medium of a flexible shaft, as indicated at 3 in Fig. 3, either of these means being sufficient to serve the purpose without introducing vibrations tending to prevent accurate results in practice. Vertical shaft 2 is mounted at the top end portion, in this instance by means of a ring of resilient material 5, which may be of rubber or some similar substance or resilient compound, ring 5 being held peripherally and laterally within a pocket 6, whose side walls form part of frame 1, and a ledge 7 around the bottom, projecting inwardly, serves to sustain from downward movement the ring journal-box 4 and its resilient ring 5.

The vertical shaft 2 is held from downward movement by the bottom end portion thereof being provided with thrust-collars, which are mounted in a box 8, the latter having a spherical-shaped outer lower part, which is movably held in a part of the frame 1, so that the upper end of shaft 2 is free to vibrate laterally.

The rotative body to be tested for overbalance is represented by pulley 9, which is mounted in this instance on shaft 2 above its upper bearings and frame 1. Arm 10 is supported so as to swing in a horizontal plane by being pivotally mounted at the end to the top portion of a standard 11 from the main frame 1. Arm 10 has a ring-shaped front end portion, and at the top of one side at 12 is pivotally attached a ring 13, which latter may be moved a small amount and held in adjusted position by means of the screw 14, which connects a lug on arm 10 with a lug on ring 13. 15 is another ring which is pivotally mounted upon ring 13 at 16 and may be moved at substantially a right angle to the movement of ring 13 on arm 10 and held in proper adjustment by means of a screw 17, which connects a lug on ring 13 with another lug on ring 15. Ring 15 has a downwardly-projecting integral annular portion, the lower edge of which is provided with an annular groove adapted to support a transparent plate 18, whose lower surface is about even with the lower surface of the ring end portion of arm 10, as plainly seen in Fig. 12. In this instance there is a circular line 19 inscribed around the bottom surface of the transparent plate 18, which may be of some black pigment in order to show distinctly, and the center thereof may also be indicated, if necessary, for the reason that this center represents the geometric center of the body to be tested.

In Fig. 3 is shown part of an ordinary electric sparking or flash-light apparatus comprising a metal collar 20, having a projection 21 and insulatingly mounted on vertical shaft 2. One pole of battery 22 is connected with one end of the primary wire of induction-coil 23, and the other end of the primary coil is connected to a brush 30, in contact with insulated metal collar 20. The other pole of battery 22 is connected to brush 26, which is adapted to be contacted by projection 21 of collar 20, and thereby suddenly make and break the connection in the battery-circuit through the primary of the induction-coil every revolution of shaft 2. The terminals of the secondary of the induction-coil are connected, by means of wires 24 and 28, respectively, with insulating binding-posts 27 and 29 at the top of ring 15, Figs. 2 and 9. At the top of ring 15, Figs. 2 and 9, are also insulated binding-posts 31, 32, and 33, which respectively serve to hold three segment-wires 34, 35, and 36, and binding-posts 27 and 29 each support short-length segments of wire 37 and 38, and the adjacent ends of each of these segments of wire are held apart to form a spark-gap, as is plainly shown in Fig. 9 at 39, 40, 41, and 42.

At the top end of shaft 2 is secured by a screw (not shown) the indicating-disk 43, which is provided with a circular series of characters 44—numerals in this instance for indicating different peripheral locations—and in the central portion is inscribed a circle 45, whose center is the geometric center of shaft 2 and the desired or geometric center of the rotative body 9. Disk 43 is disposed close to the under surface of transparent plate 18, and the circle 45 in this instance is of the same diameter as circle 19 on transparent plate 18. The arm 10, as before stated, is pivotally mounted on a standard 11, Figs. 1, 2, and 3, and adapted to swing horizontally, but is held in the position shown when the instrument is in operation by means of two brace-rods 46 and 47, which have the inner ends removably engaged with lugs at the lower side of the outer portion end of arm 10, the other ends of these rods being secured in bosses fitted to revolve on the tops of posts 48 and 49, which arise from lateral portions of frame 1, so that the inner ends of the braces may be detached and both braces swing around to the position indicated by the broken line 50 and 51, after which the arm 10 may be swung around to the position indicated by the broken line 52, when if the indicating-disk 43 is removed and no revoluble body to be tested on shaft 2 the instrument would be ready to receive, for instance, a pulley 9, which being secured in position on shaft 2 and the indicating-disk in place the arm 10 and the braces therefor may be swung back and the whole secured in the position shown in the drawings.

If the pulley 9 is very much heavier at one side than the other, gravity will cause the shaft 2 to lean toward the heavy side, and the amount of this inclination would be indicated by the circle 45 on disk 43 not registering with the circle 19 on transparent plate 18, which is illustrated in Fig. 11, where the solid circular line 19 is on the transparent disk and the broken circular line 45 represents the circular line on the indicating-disk 43, the straight broken line 53 54 indicating the direction of line of overbalance, which is in the direction of the end 54 of the broken line and between 4 and 5 on the indicating-disk 43, if in position shown in Fig. 2, where the numerals are represented as appearing through the transparent plate 18. Material may be removed from the heavy side of pulley 9 somewhere in the radial direction on the location stated or in a counterbalance added to the opposite side until circular lines 19 and 45 closely coincide, when the shaft 2, with pulley 9, should be revolved at the same or higher speed than the rate it is intended to revolve in practice, when if the balance is not satisfactory the overbalance acting centrifugally will cause the circular lines 19 and 45 to again show a deviation, which may be plainly seen and can be photographed, if desired, by virtue of the regular intermittent electric flashes every revolution of shaft 2 at the gaps 39, 40, 41, and 42 in the secondary circuit of induction-coil 23 by virtue of the circuit of battery 22 being regularly and quickly opened and closed by the action of projection 21 of collar 20 on brush 26, as before described.

A single spark-gap in the electric circuit close to the indicating means is sufficient to produce the effect of the revoluble parts standing still; but several gaps are shown in this instance, so that flashes of a much lower intensity may serve as being adapted to being disposed very close to the indicating characters at several different points.

In order to secure a sure and very sudden make-and-break device for closing and opening the electric circuit in a very small fraction of time for flash-lights in this instrument necessary for testing overbalance in rotative bodies which are to revolve at an unusually high rate of speed, the ordinary make-and-break devices shown in Figs. 14, 15, and 15$^A$ may be substituted for what has been hereinbefore shown and described, and consist, as in Figs. 14 and 15, of a wiper 55 in this instance, of insulating material, attached to shaft 2, which contacts with a metal spring 56 and causes the latter at every revolution of the shaft to make and break contact with a metal conductor 57, the conductor and spring being electrically connected with wires 25 and 28. The substitute shown in Fig. 15$^A$ consists of a collar of electric insulating material 59 on shaft 2, and in the peripheral face is secured an electrical conductor-strip 58, which is contacted by brushes 30 and 26 at the same time and by the revolution of shaft 2 cause a very sudden make and break of an electric current in the portion of the circuit between the brushes.

In the modifications illustrated in Figs. 16 to 21, inclusive, the rotative body (represented by pulley A) is mounted upon a shaft B, which is disposed horizontally, and the shaft is mounted in boxes C and D, Fig. 16, which have a spherical shape and are movably secured in the standards E and F, so as to permit the shaft to freely spring laterally when revolving with an unbalanced body secured intermediate the ends thereof, as shown. Instead of mounting the make-and-break wiper or contact projection directly upon the shaft A, as is done in Fig. 1 on shaft 2, there is a short shaft G, Fig. 20, revolubly mounted in a case H and geared to the shaft A in this instance by means of sprocket-wheels and a chain I, so that the shafts G and B revolve at the same rate, or one may revolve at a multiple of the rate of the other. Shaft G is provided with a plurality of contact cams or projections J, each disposed in a different plane of rotation and in a different position peripherally, so that each projection J represents relatively the true position of a peripheral location on pulley A, as indicated by the Roman numerals I II III IV, &c. The brushes K and L, respectively, represent brushes 26 and 27 in Fig. 3, and the projections J each represents the projection 21 on shaft 2, the metal collar 20 in Fig. 2 being represented in Figs. 20 and 21 by the long metal collar M, which is insulatingly secured on short shaft G in case or box H.

The brush K is short and adapted to be contacted by any one of the projections J once every revolution of shaft G when slid along on the metal rod N, which latter is connected to binding-post O and in electrical connection with brush K. Brush L contacts collar M same as brush 30 contacts collar 20 on shaft 2, and brush L is electrically connected to binding-post P. Wires Q and R form part of an electric circuit, in which is the spark-gap at S, close to the portion of a pulley, upon whose periphery is shown a series of Roman numerals to indicate several peripheral locations.

At T is an indicating-gage, which may be graduated, as shown, and be adjusted by means of a screw, whose handle is shown at U. The circular broken line W in Fig. 18 illustrates the position next to the pulley A, in which a disk may be placed, which disk is provided near the peripheral edge at the side or on the peripheral face with characters for indicating different peripheral locations, similar to wheel 43, Fig. 4.

The stationary indicating-gage T may serve to show the positions assumed by a disk disposed in the place indicated by circular broken line W, as well as to indicate the positions assumed by pulley A in a state of motion and at rest.

It is obvious that should pulley A revolve out of its geometric center there would be portions of the edge of the rim not coincident with the same marks or lines on gage T as some other portions, and since by sliding brush K along rod N causes the brush to contact any one or all the projections J there will be an electric spark at gap S coincident with whatever portion of the rim of pulley A any particular projection J in contact with brush K represents, so that it is easy to find the projection where the pulley-rim is most out of center and know the location by the character which represents it, which will appear as if standing still by virtue of the intermittent electric flashes at the same time relative to the revolution of shaft B. There are other means for producing regular flashes of light at certain intervals, such as is represented in Figs. 22 and 23, and comprises an electric arc-light $a$, having a reflector at $b$, a two-lens condenser at $c$, in combination with a small shaft $d$, which is driven by a chain belt by and in unison with shaft B and the pulley A, mounted thereon. Small shaft $d$ has mounted thereon a disk $e$, in which is a very narrow orifice $f$, Fig. 23, and between pulley A and disk $e$ is a plate $g$, forming the front end of the electric-lantern case, and in plate $g$ is a narrow orifice $h$, which is in register with orifice $f$ in disk $e$ every revolution. Orifices $f$ and $h$ are central in the line of light from the electric arc $a$ and condenser $c$, and since all the light is cut off by the shutter action of the imperforate portion of disk $e$ and light admitted upon the surface of pulley A during a very small fraction of the revolution of the disk $e$, which is only when orifices $f$ and $h$ are in partial or complete registry, the surface of the pulley upon which the light falls on account of the persistence of vision will appear substantially stationary, as hereinbefore described, relative to the regularly-interrupted electric current and is equally as efficient in testing revolving bodies for overbalance at comparatively low rates of speed.

In testing a number of revoluble bodies at the same speed of revolution, such as pulleys, which by being molded from the same pattern are very much alike in both form, weight, and in the distribution of weight, the amount of overbalance may be closely estimated or actually weighed by the amount such overbalance causes the pulleys to revolve out of their geometric center position against the resistance of the resilient mounting, for it is obvious that a pulley if of a given size, weight, and form and revolving at a certain speed is balanced by the addition under the rim at a given locality of a certain amount of weight then another similar pulley when tested, if the indicators show the same variation from the geometric center position, would require the same amount of weight to correct the overbalance as in the first-named case. I do not confine myself to the particular resilient means hereinbefore described for mounting a revolving body so that it is adapted to move centrifugally at the side of overbalance.

It is well known that bodies confined to revolve by centrifugally-resilient means when at a comparatively low rate of speed first present the heaviest side outwardly, and as the rate of revolution is increased up to the critical speed the center of revolution changes from the geometric axis to the axis of gravity, when the light side is presented outwardly, which change is clearly indicated by means of this instrument, so that with little practice one can easily and positively know at any rate of speed the location where to add or take weight from the body in order to attain a practically perfect balance at any given rate of speed.

It is good practice in balancing long cylindrical bodies, such as drums for sandpapering-machines and dynamo-armatures, to provide separate means for locating overbalance at each end of the body, so that indications may be read for both ends simultaneously or successively, as desired, and this arrangement obviates removal or any change in position after a body is once in position for test.

By the use of optical helps, such as the microscope, any desired degree of accuracy may be attained in finding the amount and direction of displacement from the true or desired position a revolving body may assume by not being in balance. The means for controlling the time of the light-flashes by being connected by suitable gearing with the revolving body under test may be operated at a lower rate of speed than the body, so that light-flashes may be made to occur at every other revolution or at every third, fourth, or other number of revolutions, even if the relative revolutions in which the flashes occur are very irregular; but each flash of a given series of flashes should occur when the revolving body is in the same position relatively to the last preceding flash of a given series, although there may be any number of different relative positions of the revolving body in which some given series of flashes may serve at some particular relative time for the purpose intended.

I claim as my invention—

1. In an instrument for indicating the location of overbalance in a revolving body, the combination with the frame, of a shaft yieldingly mounted in the frame, an indicating-disk secured to the shaft, and a transparent plate carried by the frame arranged in alinement with the said disk, and means arranged on the said plate from which eccentric aberrations may be indicated, substantially as described.

2. The combination with the frame, of a shaft yieldingly journaled in the casing, an indicating-disk adapted to move with the shaft, an arm pivotally mounted on the frame, a transparent plate carried by the said arm, and means carried by the said plate from which eccentric movements of the said disk may be indicated.

3. The combination with the frame, of a shaft yieldingly journaled in the frame, an indicating-disk removably secured on the end of the said shaft, an arm pivotally mounted on the frame and having its inner end ring-shaped, and a separate indicator arranged in the ring-shaped end of the said arm from which eccentric movements of the first-named indicator can be measured.

4. The combination with the frame, of a shaft yieldingly mounted therein, an indicator revolving in unison with the said shaft, a stationary indicator from which the eccentric movements of the first-named indicator can be measured, an electric circuit, means included in said circuit for producing flashes of light upon the said indicators and means for opening and closing said circuit as the said shaft is rotated.

5. The combination with the frame, of a shaft yieldingly mounted therein, an indicator revolving in unison with the said shaft, a stationary coöperating indicator carried by the frame, a ring arranged above the last-named indicator, an electric circuit having its terminals connected to the said ring, means mounted on said ring and included in said circuit for producing flashes of light, and means whereby as the shaft is rotated the said circuit is broken and made alternately.

6. The combination with the frame, of a shaft yieldingly mounted therein, means for indicating the geometric center or a desired circle of revolution of the article being tested, an electric circuit, means included in said circuit, and arranged adjacent the said indicating means, for producing flashes of light, and means for alternately making and breaking the said circuit.

7. The combination with the frame, of a shaft yieldingly mounted therein, an indicator revolving in unison with the said shaft, an arm pivotally mounted on the frame, a transparent plate secured to the free end of the said arm, an electric circuit for illuminating the said transparent plate and indicator, and, means whereby as the shaft is rotated the said circuit is alternately broken and closed, substantially as described.

8. The combination with a frame, of a shaft yieldingly journaled in the frame, an indicator moving in unison with the shaft, an arm pivotally mounted on the frame, an indicator secured to the free end of said arm, and a rod rotatably mounted on the frame and having its inner end removably secured to the said arm for holding the same in its adjusted position.

9. The combination with the frame, provided with a standard, of a shaft yieldingly mounted in the frame, an indicator secured to the said shaft, an arm pivotally mounted on the standard of the frame, said arm provided with apertured lugs, a transparent plate secured to the said arm, and swinging brace-rods to engage the lugs of the said arm, substantially as described.

10. The combination with the frame, of a shaft yieldingly mounted in said frame, said shaft being adapted to receive the body being tested, means for indicating the geometric center or a desired circle of revolution of the body being tested, said means comprising coöperating members, one of which is held stationary, an electric circuit, an illuminating device in the said circuit, and means actuated by the shaft for opening and closing the said circuit, substantially as described.

11. The combination with the frame provided with a standard, of an arm pivotally mounted on said standard, said arm being provided with a ring-shaped outer end, a transparent plate secured in the said ring-shaped end of the arm, a shaft yieldingly mounted in the frame, an indicator rigidly secured to the said shaft and arranged normally in alinement with the said transparent plate, means arranged on the said plate for indicating any eccentric movement of the said disk, an adjustable ring pivotally mounted on the outer end of the said arm, segment-wires secured to the said ring, an electric circuit with which the said segmental wires are in circuit and a cut-out actuated by the said shaft, substantially as described.

12. The combination with a centrifugally-yielding means of a shaft mounted therein, said shaft adapted to receive the body to be tested, means for indicating the center of a desired circle of revolution of the body being tested, said means comprising coöperating members one of which is held stationary, an arm, an electric circuit, segment-wires carried by the said arm the adjacent ends of which are held apart, said wires being included in the said circuit, and an electric-circuit make-and-break mechanism operated by the shaft, substantially as described.

13. The combination with a yieldingly-mounted shaft, of an indicator carried thereby, a stationary disk, a pair of adjustable rings mounted above the said disk, segment-wires carried by one of the said rings, an electrical circuit with which the said segment-wires are in circuit, and an electric make-and-break mechanism, substantially as described.

14. The combination with a frame provided with a standard, of an arm carried by the standard, and provided at its outer end with a downwardly-projecting annular portion, a transparent plate arranged in the said annular portion of the arm, a yieldingly-mounted shaft, an indicator carried by the shaft, and means for illuminating the said indicating means, as the shaft is rotated.

In testimony whereof I have signed my name to this specification in the presence of two subscribing witnesses.

OSCAR SNELL.

Witnesses:
 ALBERT B. GEORGE,
 EDWARD E. WILSON.